United States Patent
Sheckler et al.

[11] Patent Number: 5,560,874
[45] Date of Patent: Oct. 1, 1996

[54] DIFFUSER BODY

[75] Inventors: Chad A. Sheckler, Phelps, N.Y.; Harry C. Stanton, Dallas, Pa.

[73] Assignee: Refractron Technologies Corporation, Newark, N.Y.

[21] Appl. No.: 410,776

[22] Filed: Mar. 27, 1995

[51] Int. Cl.$^6$ ........................................................ B01F 3/04
[52] U.S. Cl. ........................................ 261/122.1; 501/80
[58] Field of Search .......................... 261/122.2; 501/80

[56] References Cited

U.S. PATENT DOCUMENTS

| | | | |
|---|---|---|---|
| 3,507,253 | 4/1970 | Willinger | 261/122.1 |
| 3,689,611 | 9/1972 | Hardy et al. | 501/80 |
| 3,753,746 | 8/1973 | Koerner | 261/122.1 |
| 4,046,845 | 9/1977 | Veeder | 261/122.1 |
| 4,118,450 | 10/1978 | Nakamura et al. | 501/80 |
| 4,184,885 | 1/1980 | Pasco et al. | 501/80 |
| 4,261,932 | 4/1981 | Ewing et al. | 501/80 |
| 4,261,933 | 4/1981 | Ewing et al. | 261/122.1 |
| 4,288,935 | 9/1981 | Cross | 40/120 |
| 4,746,341 | 5/1988 | Komoda | 501/80 |
| 4,820,412 | 4/1989 | Rudolphi et al. | 261/122.1 |
| 4,965,230 | 10/1990 | Nakajima et al. | 501/80 |
| 5,075,048 | 12/1991 | Veeder | 261/122.1 |
| 5,262,096 | 11/1993 | Egashira | 261/122.1 |
| 5,344,799 | 9/1994 | Wu | 501/80 |
| 5,422,043 | 6/1995 | Burris | 261/122.1 |

*Primary Examiner*—Tim R. Miles
*Attorney, Agent, or Firm*—Howard J. Greenwald

[57] ABSTRACT

A rigid, monolithic, porous gas diffusion element which is formed of a body of solid particles and which is comprised of a partially coated, permeable ceramic substrate is disclosed. The substrate consists essentially of a porous first ceramic material, has an apparent porosity of from about 35 to about 50 percent, and has a minimum active pore size of from about 40 to about 120 microns; and it is partially coated with a coating which consists essentially of a second ceramic material has an apparent porosity of from about 35 to about 55 percent, and has a minimum active pore size of from about 10 to about 40 microns. The minimum active pore size of the substrate is from about 2 to about 5 times as great as the minimum active pore size of the coating.

12 Claims, 2 Drawing Sheets

DIFFUSER BODY

FIELD OF THE INVENTION

A ceramic diffuser body containing a ceramic substrate, a base coating on the top and bottom surface of the substrate, and an outer coating contiguous with the base coating.

BACKGROUND OF THE INVENTION

Porous gas diffusion elements are well known to those skilled in the art. Thus, for example, they are disclosed in U.S. Pat. Nos. 4,261,932, and 4,262,933; the disclosure of each of these patents is hereby incorporated by reference into this specification.

These prior art porous gas diffusers are often used to diffuse a gas (such as oxygen, ozone, air, carbon dioxide, or nitrogen) into a liquid (such as waste water or drinking water). An ASCE Standard Test ("Measurement of Oxygen Transfer in Clean Water," July, 1984, ISBN 0-87262-430-7) was developed by the American Society of Civil Engineers to evaluate the efficiencies of these prior art devices.

A substantial amount of energy is required to force gas through such porous gels diffusers. The efficiencies of the prior art gas diffusion devices ranged from about 10 to about 40 percent. Thus, even a relatively small increase in such efficiency will result in a significant decrease in energy consumption.

An improved porous gas diffuser is disclosed in applicants' U.S. Pat. No. 5,215,686, which discusses a rigid, monolithic, porous gas diffusion element which contains a ceramic substrate and coating on the top and bottom surfaces of the substrate. As is disclosed in column 6 of this patent (at lines 12–15), the minimum active pore size of the substrate is preferably from about 2 to about 5 times as great as the minimum active pore size of the coating on the top of the substrate.

Although the diffusion element of U.S. Pat. No. 5,215,686 is superior to prior art diffusion elements, it still suffers from certain disadvantages. In the first place, a relatively non-uniform pattern of bubbles is dispensed from its top surface when gas is passed through its plenum; because of this non-uniform bubble distribution, the size of such diffusion element generally must be smaller than about 12 inches. In the second place, the diffusion element of such patent produces relatively coarse bubbles which thus have a relatively short dwell time in the liquid into which they are being dispensed and provide a relatively small surface area for interaction with such liquid. In the third place, because of the relatively short dwell time produced by the prior art device, a relatively long column of liquid must be used to obtain a reasonable gas transfer efficiency, thereby requiring a relatively complicated, costly system.

It is an object of this invention to provide a porous gas diffusion element which produces a substantially more uniform bubble pattern than the diffusion element of U.S. Pat. No. 5,215,686.

It is another object of this invention to provide a porous gas diffusion element which produces a gaseous discharge with a substantially greater dwell time and gas transfer efficiency than that produced by the diffusion element of U.S. Pat. No. 5,215,686.

It is yet another object of this invention to provide a porous gas diffusion element which is suitable for use with a system designed for relatively low flow rates per unit of diffuser surface area.

It is yet another object of this invention to provide a porous gas diffusion element which can be of a size up to about 20 inches and still operate efficiently.

It is yet another object of this invention to provide a porous gas diffusion element which can have a non-circular shape and still operate efficiently.

It is yet another object of this invention to provide a porous gas diffuser with an increased gas transfer efficiency.

SUMMARY OF THE INVENTION

In accordance with this invention, there is provided, a ceramic diffuser body which contains a ceramic substrate coated with an intermediate base coat and an outer ceramic membrane. The minimum active pore size of the substrate is from about 8 to about 100 times as great as the minimum active pore size of the ceramic membrane.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

Figure 1:
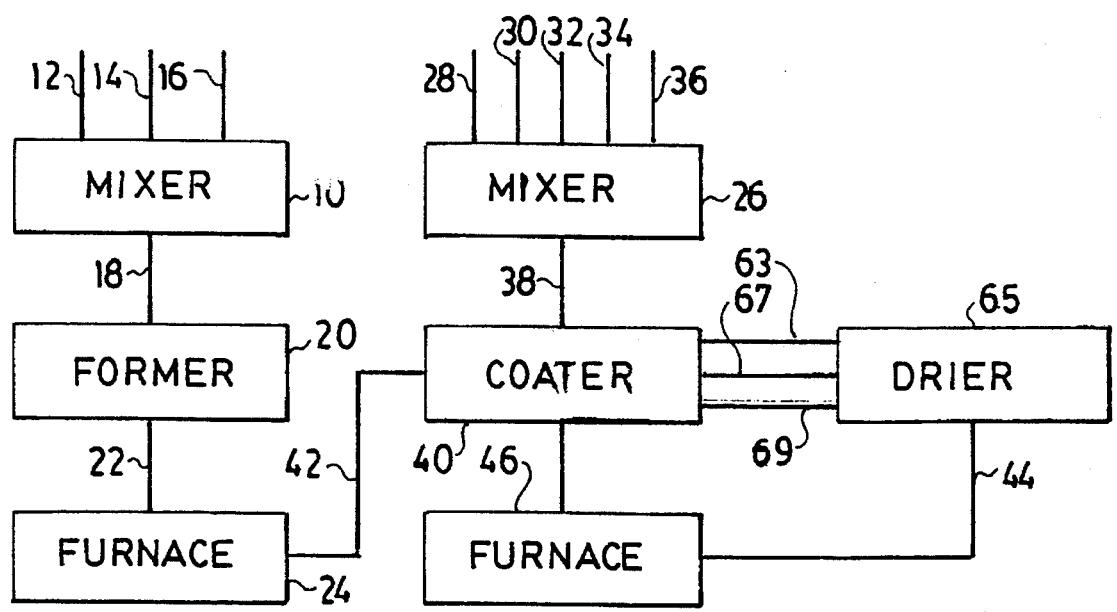
FIG. 1 is a flow diagram of one preferred process of the instant invention.

FIG. 1 illustrates one preferred process for producing the diffuser body of this invention.

Referring to FIG. 1, to mixer 10 is charged aggregate material and bonding agent. The aggregate material is preferably charged via line 12. The bonding agent is charged via line 14.

In one preferred embodiment, which is illustrated in the drawings and referred to in the remainder of this specification, the aggregate material consists essentially of ceramic material.

The ceramic material charged via line 12 preferably has a particle size distribution such that at least about 99 weight percent of its particles have a maximum dimension which is from about 15 to about 1,000 microns. In one embodiment, at least about 99 weight percent of the ceramic aggregate particles charged via line 12 have a maximum dimension of at least about 250 microns.

The ceramic aggregate material charged via line 12 preferably has a shrinkage such that, after it is formed into, a green body with a substantially circular cross-section and a diameter of 7.0 inches and fired at a temperature of 1,225 degrees Centigrade for 1 hour, it will exhibit a shrinkage of less than about 1.0 percent. The shrinkage of the material may be determined by measuring the diameter of body prior to and after firing.

From about 80 to about 95 weight percent (by combined weight of ceramic aggregate material and bonding agent) is charged to mixer 10 via line 12; and from about 20 to about 5 weight percent of bonding agent is charged to mixer 10 via line 14.

In one preferred embodiment, the ceramic material charged via line 12 is selected from the group consisting of alumina, silicon carbide, silica, mullite, zirconium silicate, and the like.

In one embodiment, the ceramic material charged via line 12 is silica, which often consists of naturally occurring sand particles. An amorphous glass binder may be added to the silica (via line 14); see, e.g., page 2 of EPA/625/8-85/010 Summary Report, "Fine Pore (Fine Bubble) Aeration Systems" (developed by the Water Engineering Research Laboratory, Cincinnati, Ohio).

In one embodiment, the ceramic material charged via line 12 is an alumina material such as, e.g., a 46 grit alumina sold by General Abrasive Treibacher, Inc. of Niagara Falls, N.Y. An elaborate binder, resembling porcelain, may be charged via line 14; see, e.g., page 3 of said E.P.A. report.

In one embodiment, the ceramic material charged via line 12 is zircon ($ZrSiO_4$). In another embodiment, the ceramic material charged via line 12 is silicon carbide.

Mullite may be used as the ceramic material charged via line 12. As is known to those skilled in the art, mullite is an aluminosilicate of the formula $3Al_2O_3.2SiO_2$.

It is preferred to use alumina as the ceramic aggregate material charged via line 12, and reference will be made to such alumina in the remainder of this specification.

In addition to the alumina (which is charged via line 12), from about 5 to about 20 weight percent of a bonding agent is charged via line 14. This bonding agent consists essentially of inorganic material, all of whose particles have a maximum dimension smaller than about 100 microns. The bonding agent preferably forms a glassy phase when subjected to a temperature of 1,225 degrees for at least 1 hour.

In one preferred embodiment, a borosilicate glass is used as the bonding agent. This borosilicate glass may be formed by combining a borosilicate frit and nepheline syenite in a mixture which contains from about 20 to about 50 weight percent of borosilicate frit and from about 50 to about 80 weight percent of nepheline syenite.

In one preferred embodiment, the bonding agent charged via line 14 is a mixture of from about 20 to about 50 weight percent of a clay material and from about 80 to about 50 weight percent of a material selected from the group consisting of feldspar, nepheline syenite, and mixtures thereof. The clay material preferably has a particle size such that substantially all of its particles have a maximum dimension smaller than about 10 microns; and it may, e.g., be ball clay or bentonite. The feldspar and/or the nepheline syenite material preferably has a particle size such that substantially all of its particles are smaller than 40 microns.

In one embodiment, the bonding agent also contains from about 20 to about 50 weight percent of glass frit.

The ceramic aggregate material and the bonding agent are mixed in mixer 10, preferably by dry mixing, until a substantially homogeneous mixture is obtained therein. Any of the mixers known to those skilled in the art may be used. Thus, e.g., one may use an Eirich R7 Mixer (Eirich Machines, Ltd., Box 550, Maple,, Ontario).

After the desired dry mixture of ceramic material and binding agent has been obtained in mixer 10, it is preferred to charge thereto via line 16 from about 3 to about 6 weight percent of a green binder which, preferably, is in liquid form. Some suitable binders which may be used are described on page 153 of James S. Reed's "Introduction to the Principles of Ceramic Processing" (John Wiley and Sons, New York, 1988).

By way of illustration, one may as a green binder an emulsion of paraffin in water, a Carbowax solution in water, polyvinyl alcohol, dextrine, and the like. In one embodiment, it is preferred to use from about 3 to about 8 weight percent of a combination of dextrine and Mobilcer J wax. Thus, in this embodiment, e.g., one may add from about 2 to about 4 weight percent of each of dextrine and Mobilcer J wax.

After the binder has been added via line 16, the mixture is then stirred until it is substantially homogeneous. Thereafter, the mixture is discharged via line 18 to former 20.

Any conventional means can be used to form the mixture in former 20. Thus, by way of illustration and not limitation, former 20 may be a press equipped with a die in the shape of a plate, a dome, or a disc. Any suitable press may be used such as, e.g., the 30-ton presses sold by the Fred S. Carver Inc. of Menomonee Falls, Wis.

The green body produced by former 20 may be in the form of a plate with a thickness of from about 1.0 to about 1.5 inches thick. The plate may have a shape which is square, or rectangular.

In one embodiment, the green body has a substantially constant wall thickness. In another embodiment, the wall thickness of the green body is not constant.

Alternatively, the green body produced by former 20 may be in the form of a disc with a diameter of from about 4 to about 20 inches and a thickness of from about 0.25 to about 3.0 inches. In one embodiment, the thickness of the disc is from about 0.5 to about 1.0 inches. In one embodiment, the diameter of the disc is either 7 inches, or 9 inches, or 9.5 inches, or 12 inches, or 20 inches. See, e.g., page 6 of said E.P.A. report.

It is preferred that the green body produced in former 20 be in the shape of a dome, resembling a circular disk with a downwardly turned edge. In one embodiment, these domes are also from about 4 to about 20 inches in diameter and from about 0.25 to about 3.0 inches thick. In one embodiment, the dome is about 7.0 inches in diameter and 1.5 inches high; in this embodiment, the media is 0.6 inches thick on the edges and 0.75 inches thick on the top or flat surface. See, e.g., page 5 of said E.P.A. report and a publication by D. H. Houck et al. entitled "Survey and Evaluation of Fine Bubble Dome Diffuser Aeration Equipment," EPA-600/2-81-222, NTIS no. PB82-105578 (United States Environmental Protection Agency, Cincinnati, Ohio, September, 1981). In another embodiment, the dome has a diameter of about 9 inches. In yet another embodiment, the dome has a diameter of about 12 inches.

The green body formed in former 20 is then passed via line 22 to furnace 24, where it is heated to a temperature of 1,225 degrees Centigrade and maintained at at least this temperature for at least 1 hour. It is preferred to heat the green body in air at a temperature of from about 1,225 to about 1,275 degrees Centigrade for at least about 8 hours. Thereafter, the heated body is then allowed to cool, preferably while in furnace 24.

Any conventional furnace may be used to heat the green body. Thus, e.g., one may use a tunnel kiln sold by the Lindberg Company, 304 Hart Street, Watertown, Wis.

The fired substrate is then preferably coated with an inorganic base coat, then dried, then coated with an inorganic top coat, then dried, and then optionally coated with an inorganic bottom coat, and then dried.

The materials required to produce one or more of the inorganic coatings for the green body from furnace 24 may be charged to mixer 26. It is preferred that the mixture(s) formed in mixer 26 have a coefficient of expansion which is from about 0.9 to about 1.1 times as great as the coefficient of expansion of the mixture formed in mixer 24.

In the preparation of the inorganic coating(s), ceramic aggregate material is preferably charged via line 28 to mixer 26. It is preferred that the ceramic aggregate material charged via line 28 be chemically identical to the ceramic aggregate material charged via line 12.

However, the aggregate material used to prepare the base coating preferably has a particle size distribution such that substantially all of its particles are between from about 40 and 70 microns in size. The particle size of aggregate material in the base coating is preferably finer than the particle size of the aggregate material in the substrate, but is it also preferably coarser than the particle size of the aggregate material in the top coating.

In the production of the top coating, it is preferred that the aggregate material charged via line 28 have a particle size distribution such that substantially all of its particles have a maximum dimension less than about 125 microns and, more preferably, less than about 12 percent of the size of the mean particle size of the ceramic aggregate material charged via line 12. By way of illustration, in one embodiment the alumina charged via line 12 has a mean particle size of greater than 250 microns, and the alumina charged via line 28 for the top coating has a mean particle size of about 20 microns.

In the preparation of the inorganic coatings, bonding agent is preferably charged to mixer 26 via line 30. It is preferred that a sufficient amount of such bonding agent be charged so that the mixer 26 contains from about 80 to about 95 weight percent of ceramic aggregate material and from about 20 to about 5 weight percent of bonding agent. A similar, or identical bonding agent may be charged via line 30 as is charged via line 14; it is preferred that the binding charged in the former line be identical to the binding agent charged via the latter line.

A sufficient amount of water is charged to mixer 26 via line 32 so that the slurry formed in such mixer has a solids content of from about 4 to about 60 weight percent.

Less than about 1.0 weight percent (and preferably less than about 0.1 weight percent) of surfactant may be added to mixer 26 via line 34. If such surfactant is used, it preferably is an anionic surfactant. Thus, e.g., one may use "DARVAN" 821A polyacrylate surfactant, which is sold by the R. T. Vanderbilt and Company of Norwalk, Conn.

From about 0.25 to about 0.5 weight percent of a suspending agent is preferably added to mixer 26 via line 36, The function of this suspending agent is to suspend maintain a mixture of the particulate components homogeneously. One may use suspending agents such as, e.g., Xanthan gum. Xanthum gum may be purchased, e.g., from Kelco, a division of Merck and Company, Inc., 8355 Aero Drive, San Diego, Calif. 92123.

The ingredients are mixed in mixer 26 until a substantially homogeneous slurry is produced. Thereafter, the slurry is discharged via line 38 to coater 40. For the top coating 62, it is preferred that substantially all of the particles in the slurry are smaller than about 125 microns and, more preferably, less than about 40 microns.

Referring again to FIG. 1, the green body from furnace 24 is passed via line 42 to coater 40. Thereafter, it is coated with a base coat 61 (see FIG. 2) which, after firing, has a minimum active pore size of from about 20 to about 40 microns. After firing, the minimum active pore size of the base coat is generally from about 2 to about 10 times as great as the minimum active pore size of the top coat 62 (see FIG. 2), the latter top coat generally having a minimum active pore size of from about 0.5 to about 8 microns.

It is preferred that, after firing, the minimum active pore size of the ceramic substrate be from about 4 to about 50 times as great as the minimum active pore size of base coat 61.

The base coat 61 preferably has a thickness of from about 0.1 to about 0.5 millimeters. It may be applied to the substrate 60 by conventional means.

By way of illustration and not limitation, the body from furnace 24 may have the base coat sprayed onto its exterior surface using, e.g., a Binks Model 7 air-atomizing hand gun (manufactured by the Binks Manufacturing Company of 9201 West Belmont Avenue, Franklin Park, Ill.). Thereafter, referring again to FIG. 1, the coated substrate 60 may then be passed via line 63 to drier 65, wherein it is dried to a moisture content of less than about 5 weight percent.

The dried, coated substrate may then be passed via line 67 to coater 40, wherein top coating 62 may be applied to the substrate. It is preferred that top coating 62, after firing, have a minimum active pore size of from about 0.5 to about 8 microns. It is also preferred that, after firing, the minimum active pore size of the top coat is generally at least about 2 times as great as the minimum active pore size of the optional bottom coat 67 (see FIG. 2).

It is preferred that, after firing, the minimum active pore size of the ceramic substrate is from about 8 to about 100 times as great as the minimum active pore size of top coat 62.

The top coat 62 preferably has a thickness of from about 0.1 to about 0.5 millimeters. It may be applied to the substrate 60 by conventional means.

Referring again to FIG. 1, the partially coated green body is then removed from coater 40 and passed via line 67 to drier 65, wherein it is dried to a moisture content of less than about 5 weight percent.

Figure 2:
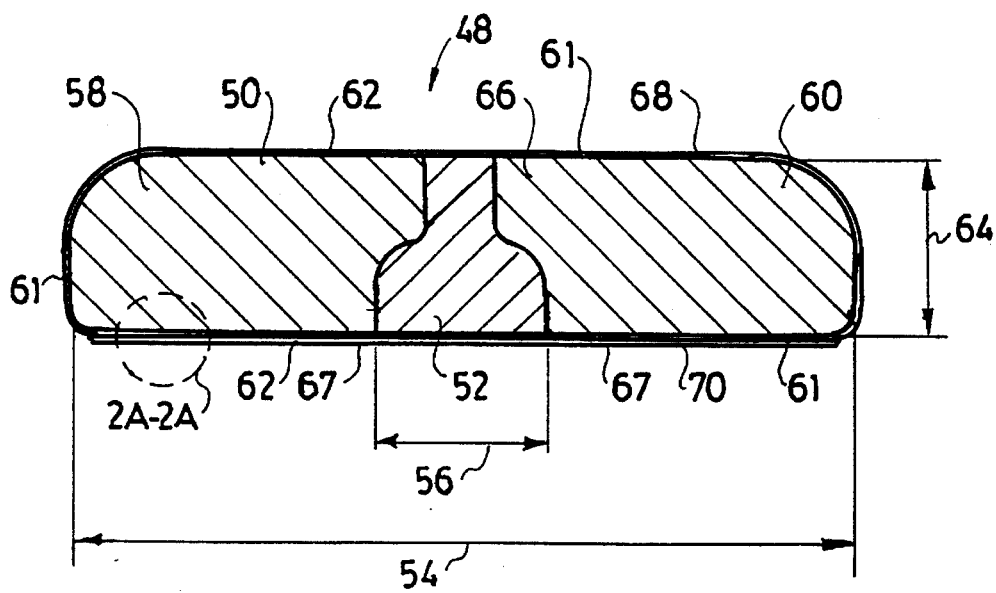
FIG. 2 is a sectional view of one preferred diffuser of the instant invention.
Figure 2A:
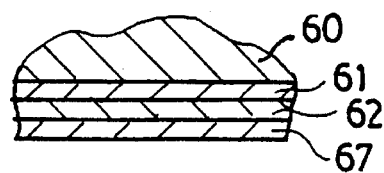
FIG. 2A is an enlarged, partial sectional view of one portion of the diffuser of FIG. 2.

Referring to FIG. 2, an optional bottom coat 67 may now be added to the coated substrate 60. Bottom coat 67 may be added by masking the top and side surfaces of the substrate and spraying or otherwise applying ceramic slurry to the bottom surface. Thus, e.g., the dried substrate may be passed via line 69 to coater 40, wherein bottom coat 67 may be applied; and the coated substrate may then be passed via line 69 to drier 65, wherein it may again be dried to a moisture content of less than about 5 weight percent.

In one embodiment, the bottom coat 67, after firing, has a particle size distribution such that, after firing, the minimum active pore size of the ceramic substrate is from about 16 to about 200 times as great as the minimum active pore size of top coat 62, and the minimum active pore size of coating 62 is at least 2 times as great as the largest pore size of bottom coat 67.

Referring again to FIG. 1, the coated substrate 60 is passed from drier 65 via line 44 to furnace 46, where it is fired in substantial accordance with the procedure used in furnace 24. It is preferred to heat the coated green body at a temperature of from about 1,225 to about 1,275 degrees Centigrade for at least about 1 hour and, more preferably, for at least about 8 hours.

A sectional view of one preferred porous gas diffuser body is illustrated in FIG. 2. Referring to FIG. 2, it will be seen that, in this embodiment, diffuser 48 is preferably a dome-shaped body 50 comprised of gas inlet orifice 52. The diameter 54 of body 50 is at least about 2.0 times as large as the maximum diameter 56 of gas inlet orifice 52; and the cross-sectional area of the solid portion of body 50 (the sum of the areas of sections 58 and 60) is at least about 3.5 times as great as the cross-sectional area of the hatched orifice area 52.

In the embodiment illustrated in FIG. 2, the coatings 61, 62, and 67 are each prepared from alumina and a bonding agent containing about 30 weight percent of ball clay and 70 weight percent of nepheline syenite. In this embodiment, the coatings 61, 62, and 67 each have a thickness which is preferably from about 0.1 to about 1.0 millimeters and, generally, is less than about 5 percent of the thickness 64 of the substrate 66. In one preferred embodiment, the maximum thickness of substrate 66 is 1.5 inches, and the coatings 61, 62, and 67 each have a thickness of from about 0.4 to about 0.6 millimeters.

The substrate 66 preferably has an apparent porosity of from about 35 to about 50 percent; as is known to those skilled in the art, apparent porosity is the relationship of the open pore space to the bulk volume, expressed in percent (see A.S.T.M. C242-87). The coating 62 also has an apparent porosity of from about 35 to about 55 percent. Although the porosity of the coating 62 may be identical to or smaller than the porosity of substrate 66, it often is at least about 2.0 percent higher than the porosity of substrate 66.

The substrate 66 must have sufficient strength for its intended use. In one embodiment, the substrate 66 has a strength of at least about 1,000 pounds per square inch. For discs and domes, measurement of strength usually involves supporting the diffuser in a fashion similar to that used for the final assembly and then applying a 1,000 pound load to a 25 millimeter (1.0 inch) diameter area in the center of the diffuser.

The minimum active pore size of substrate 66 is greater than the minimum active pore size of coating 62. As used in this specification, the term minimum active pore size refers to the smallest pore in the diffuser which is actively diffusing gas into the liquid medium. As is known to those skilled in the art, the pore size distribution of a porous body may be determined in accordance with A.S.T.M. Standard Test Method F316-86, "Test Method for Pore Size Characteristics of Membrane Filters for Use with Aerospace Fluids." In this test, porous bodies are mounted on a gas plenum and immersed in a liquid of known surface tension. The plenum is slowly pressurized, and observations are made of the pressure at which the first bubble is released from the body at various gas flow rates.

The minimum active pore size of substrate 66 is generally from about 40 to about 120 microns. The minimum active pore size of coating 62 is generally from about 0.5 to about 8 microns. In general, the minimum active pore size of substrate 66 is from about 8.0 to about 100 times as great as the minimum active pore size of coating 62. It is preferred that the minimum active pore size of substrate 66 be from about 20 to about 30 times as great as the minimum active pore size of coating 62. In one preferred embodiment, the minimum active pore size of substrate 66 is about 25 times as great as the minimum active pore size of coating 62.

In one embodiment, not shown, the bottom coat 67 does not contain ceramic material but is comprised of, or consists of, a non-porous, non-ceramic material such as, e.g., TEFLON, HYPALON, and the like. As will be apparent to those skilled in the art, any non-porous material which is substantially inert in the environment of use may be used.

As is known to those skilled in the art, "TEFLON" is a trademark for tetrafluoroethylene polymers which are available as molding and extrusion polymers, aqueous dispersions, films, finishes, and multifilament yarn or fiber; the mark is owned by the E. I. dupont deNemours Company of Wilmington, Del.

As is also known to those skilled in the art, "HYPALON" is a trademark for chlorosulfonated polyethyelne; this mark is also owned by the E. I. dupont deNemours Company.

Figure 3:
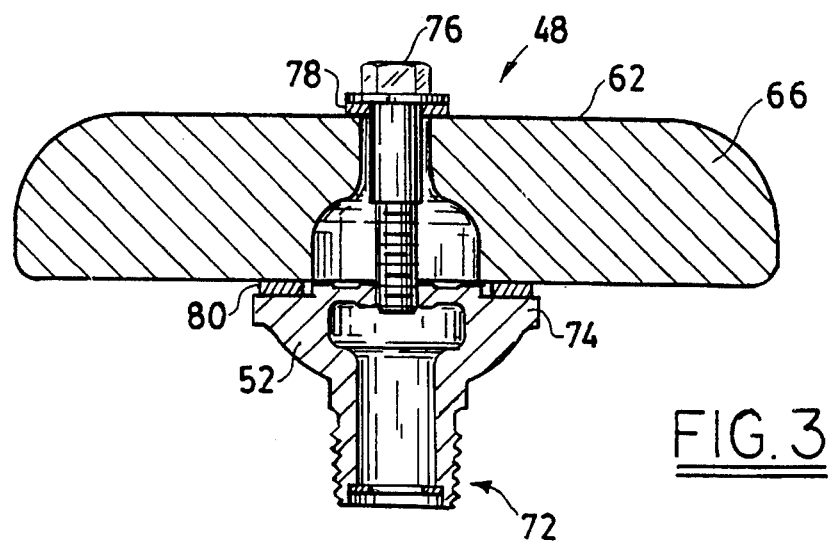
FIG. 3 is a sectional view of the diffuser of FIG. 2 connected to a source of gas; and Each of FIGS. 4 and 5 is a sectional view of another preferred diffuser of the instant invention.
Figure 4:
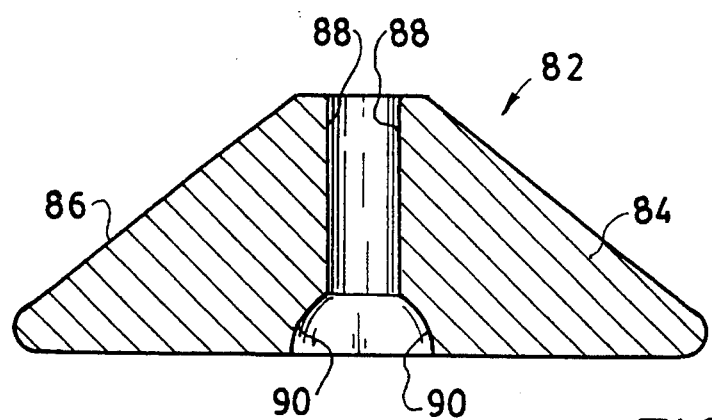
Figure 5:
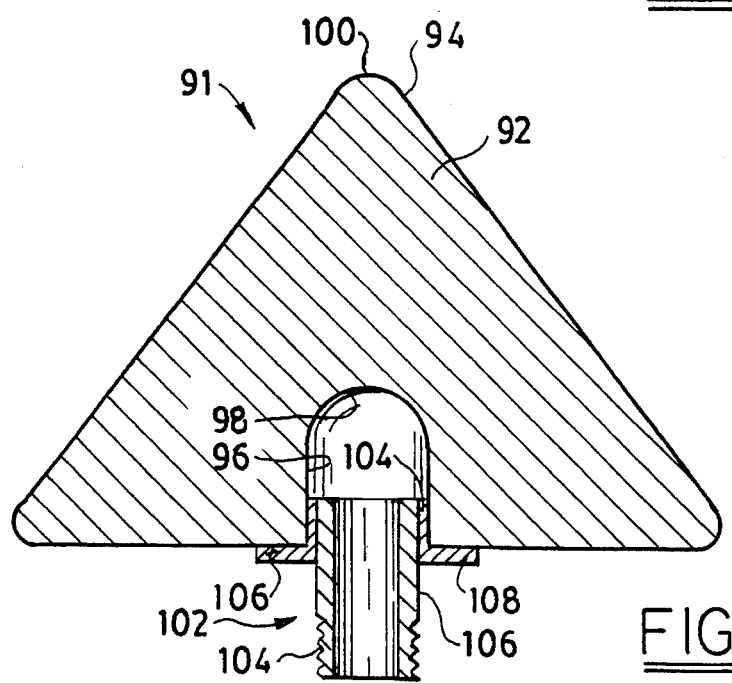

FIG. 3 illustrates the diffuser body 48 of FIG. 2 connected to a source of gas 72; this embodiment is especially suitable for diffusing ozone gas. In FIGS. 3, 4, and 5, for the sake of simplicity of representation, coats 61 and 67 have been omitted.

Referring to FIG. 3, it will be seen that diffuser body 48 is attached to inlet casting 74 by means of bolt 76, gasket 78, and gasket 80. In this embodiment, bolt 76 is preferably a stainless steel bolt. Gaskets 78 and 80 are preferably an ozone-resistant elastomeric material such as "HYPALON" 70 (a chlorosulfonated polyethylene sold by the Du Pont de Nemours and Company of Wilmington, Del.).

As is disclosed on pages 22–24 of EPA/625/1/-89/023, "Design Manual: Fine Pore Aeration Systems," United States Environmental Protection Agency, Center for Environmental Research Information, Cincinnati, Ohio, the uniformity of individual diffusers, and the entire aeration system, is important if high oxygen transfer efficiencies are to be attained The uniformity of the diffuser body may be tested with a visual test. Alternatively, or additionally, the uniformity of the diffuser may be tested with the uniformity tests described the Environmental Protection Agency's "Design Manual—Fine Pore Aeration Systems" (EPA/625/1-89/023, published in 1989 by the Center for Environmental Research Information, Risk Reduction Engineering Laboratory, Cincinnati, Ohio). One such uniformity test measures the water displaced from an inverted graduated cylinder in a given period of time and compares the flow rate so determined for a specific location above the diffuser to other areas. A diffuser's uniformity can be measured by comparing the values for different areas of its active surface.

FIG. 4 is a sectional view of another preferred embodiment of applicant's invention, illustrating a conically-shaped diffuser body. This sectional view, like the sectional views depicted in FIGS. 2 and 3, was taken through a section taken through the centerpoint of the top surface of the diffuser body.

Referring to FIG. 4, diffuser body 82 is comprised of substrate 84 and coating 86, which are similar to the substrate 66 and coating 62 depicted in FIGS. 2 and 3. As with the diffuser body of FIGS. 2 and 3, the coating 86 is not applied to the interior surfaces 88 and 90 of the diffuser body 82.

FIG. 5 is a sectional view of another preferred embodiment of applicant's invention, illustrating another conically-shaped diffuser body 91. Referring to FIG. 5, it will be seen that substrate 92 is coated with coating 94 over substantially every exterior surface except for exterior surfaces 96 and 98. Thus, unlike the embodiment of FIG. 3, the tip 100 contains operative diffusing material (coating 94).

An adaptor, such as adaptor 102, is connected to substrate 92 by conventional means such as, e.g., adhesive 104, adhesive 106, and adhesive 108. In the preferred embodiment illustrated in FIG. 5, adaptor 102 preferably contains pipe threads 104 and a flat section 106 which a wrench may grasp.

The adaptor 102 may be made from conventional materials such as, e.g., plastic material (such as polyvinyl chloride), metal material (such as stainless steel), and the like.

It will be apparent to those skilled in the art that the self-supporting diffuser head embodiments of applicants' invention are substantially less expensive than the prior art devices which required fabricated holders (which often consisted of plastic or stainless steel) and which usually communicated with precise orifices and often presented leakage problems at the junctures of the holders and the diffuser bodies. Applicants' devices are substantially less likely to present such leakage problems and are greatly simplified structures.

It will also be apparent to those skilled in the art that applicants' invention is not limited to diffuser bodies with the shapes depicted in FIGS. 2, 3, 4, and 5. Thus, differently shaped diffuser bodies may be made in accordance with applicants' invention such as, e.g., diffuser bodies with the shape of disks, square plates, rectangles, and prismatic shapes.

The following example is presented to illustrate the claimed invention but is not to be deemed limitative thereof. Unless otherwise specified, all parts are by eight, and all temperatures are in degrees centigrade.

EXAMPLE 1

In this Example, a 7.0 inch diameter×1.5 inch thick diffuser, which has the shape depicted in FIG. 2, was prepared.

30 parts of a Bell Dark ball clay (which is available from the Kentucky-Tennessee Clay Company, P.O. Box 6002, Mayfield, Ky. 42066) were mixed with 70 parts of nepheline syenite (available from Falconridge Ltd., 365 Bloor Street East, Toronto, Ontario M4W3L4) until a substantially homogeneous mixture was obtained.

To an Eirich R-11 mixer (manufactured by the Eirich Machines, Ltd., Box 550, Maple, Ontario, Canada) was charged 440 pounds of 46 grit brown, fused alumina (sold by Treibacher Schleifmittel company of 2000 College Avenue, Niagara Falls, N.Y. 14302), 60 pounds of the ball clay/ nepheline syenite mixture, 30 pounds of "MOBILICER J" wax (sold by the Polygon Corporation of 200 West Second Street, South Boston, Mass. 02127), and 20 pounds of water. The mixture was stirred for 4 minutes until a substantially homogeneous paste was obtained.

About 5.0 pounds of the paste was charged to a D2 hardened steel die with a with an interior shape similar to that of FIG. 2, an inner diameter of 7.0 inches, a height of 1.5 inches, a bottom plenum diameter of 1.75 inches, and a top plenum diameter of 0.5 inches. The paste was then compacted within the die to form a shaped green body, using a pressure of about 15 tons of load with a Dennison press.

The green body thus formed was then discharged from the die and loaded into a a Lindberg tunnel kiln (manufactured by the Lindberg Division of General Signal, 304 Hart Street, Watertown, Wis.). It was raised from ambient temperature to a temperature of 2,235 degrees centigrade over a period of 30 hours, maintained at a temperature of 2,235 degrees centigrade for 6 hours, and thereafter allowed to cool to ambient temperature over a period of 24 hours.

A base coat slurry was prepared by mixing 17.2 parts of 180 grit brown fused alumina (obtained from said Treibacher Schleifmittel company), 2 parts of the aforementioned ball clay/nepheline syenite mixture, 0.5 parts of Darvan 821A polyacrylate surfactant (sold by R. T. Vanderbilt and Company of Norwalk, Conn.), 0.5 parts of xanthum gum (obtained as "KELSAN" from the Kelco Division of Merck, Inc., 20 North Wacker Drive, Chicago, Ill. 60626), and 80 parts of water. The substrate was dipped into this slurry for 30 seconds, removed, and allowed to air dry for 24 hours.

An outer coat slurry was prepared which was identical to the base coat slurry in every respect except that 600 grit brown fused alumina (obtained from said Treibacher Schliefmittal company) was used in place of the 180 grit brown fused alumina. This slurry was sprayed onto the substrate with a Binks Model 7 spray gun ( Binks Manufacturing Company, 9201 West Belmont Avenue, Franklin Park, Ill.) and then allowed to air dry for 24 hours.

A bottom coat slurry was prepared by mixing 45 parts of A12 Alcoa calcined alumina with a 4 micron particle size (obtained as catalog number 703 from Whittaker, Clark & Daniels, of 1000 Coolidge Street, South Plainfield, N.J. 07080), 5 parts of the ball clay/nepheline syenite mixture, 0.1 part of Darvan 812A polyacrylate surfactant, 0.2 parts of xanthum gum, and 49.7 parts of water. This slurry was sprayed onto the bottom surface of the substrate, and the substrate was then allowed to air dry for 24 hours.

Thereafter the substrate was placed in a Lindberg tunnel kiln, its temperature was then raised from ambient to a temperature of 2,200 degrees centigrade over a period of 6 hours, it was maintained at a temperature of 2,200 degrees centigrade for 4 hours, and thereafter it was cooled to ambient temperature over a period of 6 hours.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A rigid, monolithic, porous gas diffusion element which is formed of a body of solid particles and which is comprised of a partially coated, permeable ceramic substrate, wherein:
   (a) said substrate is an integral structure comprised of a top substrate surface, a bottom substrate surface, and an orifice extending upwardly from bottom substrate surface and defining an interior substrate surface, wherein the maximum dimension of said substrate is at least 2 times as large as the maximum dimension of said orifice;
   (b) said substrate is comprised of a porous first ceramic material, has an apparent porosity of from about 35 to about 50 percent, and has a minimum active pore size of from about 40 to about 120 microns;
   (c) said substrate is coated with a base coating which is bonded to and extends over said top substrate surface and said bottom substrate surface, wherein:
      1. said base coating is not bonded to and does not extend over said interior substrate surface;
      2. said base coating comprises a second ceramic material and has a minimum active pore size of from about 20 to about 40 microns;
   (d) said substrate is coated with a top coating which is bonded to and extends over that portion of said base coating which is bonded to said top substrate surface, wherein:
      1. said top coating is not bonded to and does not extend over said interior substrate surface, and 2. said top coating is comprised of a third ceramic material and has an active pore size of from about 0.5 to about 8 microns;

(e) the minimum active pore size of said substrate is from about 8 to about 100 times as great as the minimum active pore size of said top coating; and (e) the minimum active pore size of said substrate is from about 4 to about 50 times as great as the minimum active pore size of said base coating.

2. The gas diffusion element as recited in claim 1, wherein said gas diffusion element is dome-shaped.

3. The gas diffusion element as recited in claim 2, wherein said first ceramic material is comprised of at least about 80 weight percent of alumina.

4. The gas diffusion element as recited in claim 3, wherein said second ceramic material is comprised of at least about 80 weight percent of alumina.

5. The gas diffusion element as recited in claim 4, wherein said gas diffusion element has a diameter of from about 6 to about 20 inches.

6. The gas diffusion element as recited in claim 5, wherein said orifice has a diameter of from about 1.5 to about 2.5 inches.

7. A gas diffusion apparatus comprised of the the gas diffusion element as recited in claim 1, wherein said gas diffusion apparatus is comprised of means for supplying gas to said gas diffusion element.

8. The gas diffusion apparatus as recited in claim 7, wherein said gas diffusion element is dome-shaped.

9. The gas diffusion apparatus as recited in claim 8, wherein said first ceramic material is comprised of at least about 80 weight percent of alumina.

10. The gas diffusion apparatus as recited in claim 9, wherein said second ceramic material is comprised of at least about 80 weight percent of alumina.

11. The gas diffusion apparatus as recited in claim 10, wherein said gas diffusion element has a diameter of from about 6 to about 20 inches.

12. The gas diffusion apparatus as recited in claim 11, wherein said orifice has a diameter of from about 1.5 to about 2.5 inches.

* * * * *